US007548837B2

(12) United States Patent
Sapp

(10) Patent No.: US 7,548,837 B2
(45) Date of Patent: Jun. 16, 2009

(54) SIMULATION OF STRING VIBRATION

(75) Inventor: Markus Sapp, Pinneberg (DE)

(73) Assignee: Apple Inc., Cupertino, CA (US)

( * ) Notice: Subject to any disclaimer, the term of this patent is extended or adjusted under 35 U.S.C. 154(b) by 611 days.

(21) Appl. No.: 10/758,669

(22) Filed: Jan. 14, 2004

(65) Prior Publication Data

US 2005/0154569 A1 Jul. 14, 2005

(51) Int. Cl.
*G06F 7/60* (2006.01)

(52) U.S. Cl. .......................................................... 703/2

(58) Field of Classification Search ..................... 703/2, 703/7, 9

See application file for complete search history.

(56) References Cited

OTHER PUBLICATIONS

Turkyilmaz, Y. and Egeland, O., Boundary Control Design for Towed Cables via Backstepping, In Proceedings of the 7th European Control Conference, 2003.*

Burgh et al.; The study of parametric excitation in a stretched string; Nonlinear Analysis (Pergamon); pp. 387-400; 2001.*

Chin; A numerical model of a towed cable-body system; ANZIAM J. 42 (E) pp. 362-384, 2000 C362.*

Kurmyshev; Transverse and longitudinal mode coupling in a free vibrating soft string; Physics Lett. A; pp. 148-160; 2002.*

Alberti; Stationary response of an infinite cable to a correlated moving turbulent force field; J. Acous. Soc. Amer.; pp. 1831-1833; 1981.*

Markus Sapp, Untersuchungen zur Synthese naturlich erscheinender Klange (Investigations to the synthesis of naturally appearing sounds), ISBN 3-8265-9318-9, Shaker Verlag, 2001 (Abstract translated into English), pp. 1-103.

* cited by examiner

*Primary Examiner*—Hugh Jones
(74) *Attorney, Agent, or Firm*—Blakely, Sokoloff, Taylor & Zafman LLP

(57) ABSTRACT

A method of simulating a string using a wave equation which relates movement of the string in time to force acting on the string, wherein the force acting on the string simulates a stream of a fluid medium flowing relative to the string. The simulated string is supported between two supports and is aligned at rest in a first direction between the two supports, a first of which allows movement in a second direction orthogonal to the first direction and a second of which does not allow movement. The string is then caused from rest to vibrate in a plane, which includes the first and second directions, by turbulence in the fluid flow causing the stream of fluid medium to exert a pressure on the string in the second direction. Movement of the string out of alignment with the first direction causes the stream of fluid medium flowing in the first direction to exert a force on the string in the second direction.

42 Claims, 5 Drawing Sheets

SIMULATION OF STRING VIBRATION

BACKGROUND

The present invention relates to the simulation of vibrations in a string. Such simulation can be used to generate musical sounds by computational devices such as a computer system.

It is well known that the oscillations of a vibrating string can be modelled and the results can be converted into sound. Thus, the vibration of each of the strings of a stringed instrument can be modelled by a sound synthesiser.

There are several possible approaches to modelling a vibrating string, for example for use in sound synthesis. One such approach is to describe the modelled string by means of a differential equation, which can then be solved numerically by means of a standard iterative method using a computer. Thus, the wave equation of the modelled vibrating string is solved by iterative successive approximation, as discussed in “Synthesizing Musical Sounds by Solving the Wave Equation for Vibrating Objects”: L Hiller and P Ruiz; Journal Audio Engineering Society, 1971, Vol. 19, pp 462-470 (Part I) and 542-551 (Part II). This iterative successive approximation uses finite differences in time and space to solve the equation. Accordingly, this method is known as the finite difference method.

The continuous wave differential equation for a stiff string with one degree of freedom is:

$$M\frac{\partial^2 y}{\partial t^2} = T\frac{\partial^2 y}{\partial x^2} - S\frac{\partial^4 y}{\partial x^4} + L_T\frac{\partial^3 y}{\partial x^2 \partial t} - L_S\frac{\partial^5 y}{\partial x^4 \partial t} - L_v\frac{\partial y}{\partial t} + F(x, t) \quad \text{(Equation 1)}$$

where

F(x, t) denotes an external force at coordinate x on the string at time t;

M denotes mass per length;

S denotes stiffness of the string;

T denotes tension of the string;

Ls denotes a loss associated with the stiffness of the string;

Lt denotes a loss associated with the tension of the string; and

Lv denotes a loss associated with the turbulent flow of the air surrounding the string.

Several conditions are assumed for this wave equation. The first is that the string is rigidly supported at each end and vibrates in one plane only. Thus, every point on the string can only move in a straight line perpendicular to a line joining the end supports. This means that the string does not stretch and vibrate longitudinally. In addition, the amplitude of oscillations of the string is small compared with the string’s length. However, the string need not have a uniform density along its length.

Such a string can be modelled as shown in FIG. 1. In FIG. 1, the string 100 comprises a plurality of discrete elements j, from j=0 at the extreme left-hand end to j=x−1 at the extreme right-hand end. The string is rigidly supported at discrete element j=0 at the left-hand end and at discrete element j=x−1 at the right-hand end by supports 110. At rest, all the discrete elements j are aligned in the x-direction. During vibration, the discrete elements j can move only in the y-direction, which is orthogonal to the x-direction. Thus, the plane of vibration is the plane of the paper on which FIG. 1 is drawn. The z-direction is orthogonal to the plane of vibration. The distance between each discrete element is dx.

As shown in “Untersuchungen zur Synthese natürlich erscheinender Klänge”: M Sapp; Shaker Verlag, ISBN 3-8265-9318-9, using this model and assuming that dx=1 and dt=1, the solution of the continuous wave equation (Equation 1) can be approximated using the following discrete recursion formula:

$$\begin{aligned} y[n+1, j] = {} & (y[n, j-2]c1 + y[n, j-1]c2 + y[n, j]c3 + \\ & y[n, j+1]c2 + y[n, j+2]c1 + y[n-1, j-2] \\ & c4 + y[n-1, j-1]c5 + y[n-1, j]c6 + \\ & y[n-1, j+1]c5 + y[n-1, j+2]c4) / \\ & M[j] + 2y[n, j] + F[n, j] / M[j] \end{aligned} \quad \text{(Equation 2)}$$

in which:

y[n, j] denotes the excursion of discrete element j in the y-direction at time n;

y[n+1, j] denotes the excursion of discrete element j in the y-direction at time n+1;

y[n, j+1] denotes the excursion of discrete element j+1 in the y-direction at time n;

M[j] denotes the mass of discrete element j;

F[n, j] denotes an additional external force acting on a discrete element j at time n; and c1 to c6 are coefficients, which depend on the material parameters of the string and the surrounding media.

More specifically, coefficients c1 to c6 can be calculated as follows:

$c1=-(S+Ls);$ $c2=T+4S+Lt+4Ls;$ $c3=-(2T+6S+Lv+2Lt+6Ls);$ c4=Ls;

$c5=-(Lt+4Ls)$; and $c6=Lv+2Lt+6Ls$

Since the excursion of elements j=1 to j=x−2 needs to be calculated using the recursion formula and the recursion formula requires elements j−2 and j+2 for calculating the next excursion of element j, additional dummy elements at j=−1 and at j=x are needed. These dummy elements can be visualised as lying at the ends of the strings outside the supports 110. At the rest position at time n=0, these dummy elements are assigned a position in alignment with the other elements. Thus, y[0, −1]=0 and y[0, x]=0. After each calculation of new excursions for all elements, these dummy elements are set to the negated relative excursion of their respective counterpart elements j=1 and j=x−2 on the other side of the supports 110.

Starting from an initial excursion for each of the discrete elements j=0 . . . x−1 at time steps n=0 and n=−1, the excursion y for each discrete element j=1 . . . x−2 (in other words all the discrete elements between the supports) at time n=1 can be calculated using the recursion formula. Accordingly, for each further time step n=2, 3 . . . the new excursions for all elements can be calculated based on the excursions of the previous two time steps and the values of any external forces F[n, j] that have been applied for these time steps. Since the string will initially be at rest, the initial excursion for each of the discrete elements at time steps n=0 and n=−1 will be y[−1, j]=0 and y[0, j]=0 for all j.

Several methods for exciting such a simulated string and hence applying a force to the discrete elements are known. These include exciting the string in a percussive way, for example using a modelled piano hammer or a modelled plectrum to hit, pluck or otherwise strike the simulated string. These modelled strikers may be discretised mass-spring models, possibly with non-linear spring characteristics, that interact with the simulated string to mathematically define F[n, j] for use in the discrete recursion formula (Equation 2). However, if the modelled string is only struck once, then the force F[n, j] acting on the discrete elements j of the simulated string occurs only over a short period of time. Due to the loss coefficients c1 to c6, the string will gradually return to its initial rest state. Thus, the vibrations of the simulated string due to modelled strikers such as piano hammers and plectrums are not self-sustained. The term "self-sustained" is a specific term for an oscillation that is driven by a continuous energy source. In particular, self-sustained oscillations arise when a continuous energy source drives a resonator—such as a string under tension—by means of a non-linear energy coupling.

The only common way to achieve self-sustained vibration of the string is to use a modelled bow, which mimics the action of a bow on a violin or cello. As an example, in one very simplified bow model, the portion of the string being bowed is assumed to be a single point in contact with the bow. As the bow moves in one direction, this single point is deemed to assume a first state, in which it moves with and at the same speed as the bow, and then to assume a second state in which it slips against the bow without friction. Thus, the bow moves in the plane of vibration of the simulated string. This cycle between the first and second states is continuously repeated so long as the bow is moving. The time at which the point transitions from the first mode to the second mode is determined as a function of the bowing pressure. The point transitions from the second mode to the first mode when the natural vibration of the string causes it to move again in the same direction as the bow. More advanced bow models do not assume the portion of the string being bowed to be a single point in contact with the bow and use non-linear friction characteristics instead of the simple slip-stick mechanism described above.

Self-sustained oscillations in a resonator are also found in wind instruments such as the flute, in which an air jet from the player's lips interacts with the possible standing waves already set up inside the flute. However, the models that are commonly used for simulating wind instruments in sound synthesisers are based on travelling wave models. Travelling wave models are also known as feedback delay loops or waveguide models. In travelling wave models, each interaction point of the travelling wave is modelled as a scattering junction. Thus, compared to string models based on finite differences, travelling wave models are not so well suited for simultaneous interactions with multiple objects such as modelled piano hammers, plectrums and bows.

SUMMARY

According to the present invention, there is provided a method, in one exemplary embodiment, of simulating a string using a wave equation that relates movement of the string in time to force acting on the string, wherein the force acting on the string simulates a stream of a fluid medium flowing relative to the string.

Preferably, the simulated string is supported between two supports and is aligned at rest in a first direction between the two supports, a first of which allows movement in a second direction orthogonal to the first direction and a second of which does not allow movement. The string is then caused from rest to vibrate in a plane, which includes the first and second directions, by turbulence in the fluid flow causing the stream of fluid medium to exert a pressure on the string in the second direction.

Movement of the string out of alignment with the first direction causes the stream of fluid medium flowing in the first direction to exert a force on the string in the second direction.

Thus, the present invention provides a method of exciting a string modelled by use of finite differences by "blowing" on the string. The ability of the string to be excited simultaneously by hitting, plucking, bowing and the like may also be maintained.

The present invention provides a method of exciting a string modelled by use of finite differences by "blowing" along the length of the string and that can also be excited by hitting, plucking and bowing.

BRIEF DESCRIPTION OF THE FIGURES

Embodiments of the present invention will now be described by way of further example only and with reference to the accompanying drawings, in which.

DETAILED DESCRIPTION

Generally, the prior art model of the string assumes that the string is provided in air. Thus, the prior art differential continuous wave equation for a stiff string (Equation 1) includes a loss coefficient, Lv, which denotes a loss associated with the turbulent flow of the air surrounding the string. However, the prior art model of a string at rest shown in FIG. 1 cannot be excited by a stream of air flowing in a direction parallel to the string—that is, in the x-direction. In other words, in prior art models it is impossible to generate a sound by simulating a player blowing along the length of the string. Moreover, it has not been previously known to simulate blowing along the length of a previously excited string to excite the string further. Indeed, no known prior art modelling has been performed to date to simulate blowing a model string.

Figure 5:
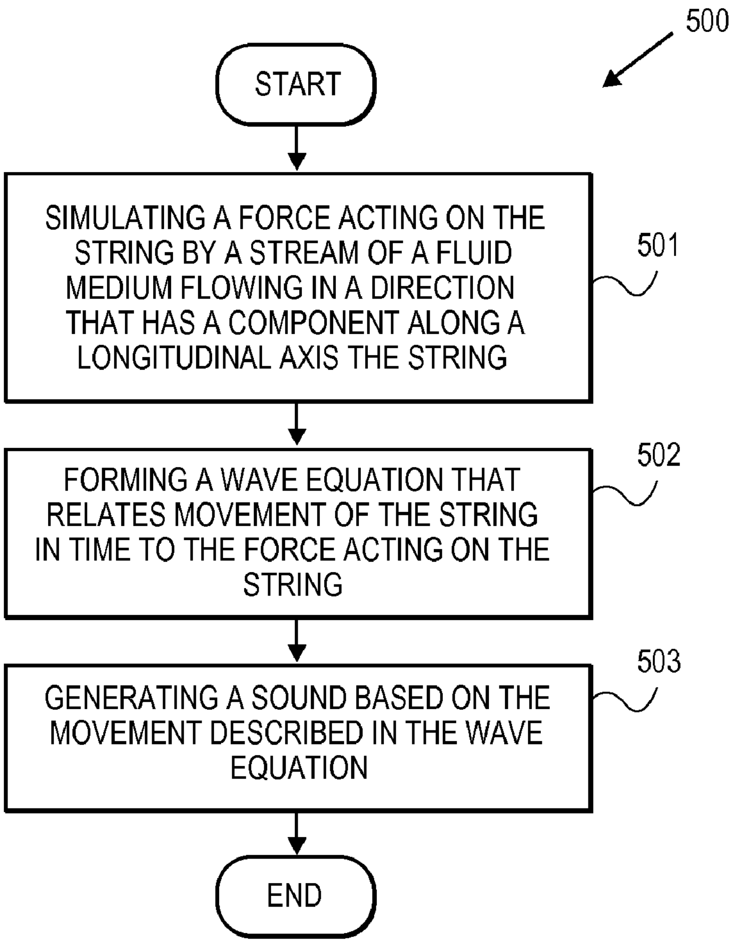
FIG. 5 shows an embodiment of a method for simulating a string.

According to the present invention, the force acting on the modeled string is simulated by a stream of a fluid medium and consequently exerting a force to excite oscillations in the string. FIG. 5 shows an embodiment of a method 500 for simulating a string. At processing block 501, the force acting on the string is simulated by a stream of a fluid medium flowing in a direction that has a component along the longitudinal axis of the string. At processing block 502, a wave equation is formed to relate movement of the string in time to the force acting on the string. At processing block 503, a sound is generated based on the string movement described in the wave equation. Details of method 500 are provided in the following descriptions.

Figure 1:
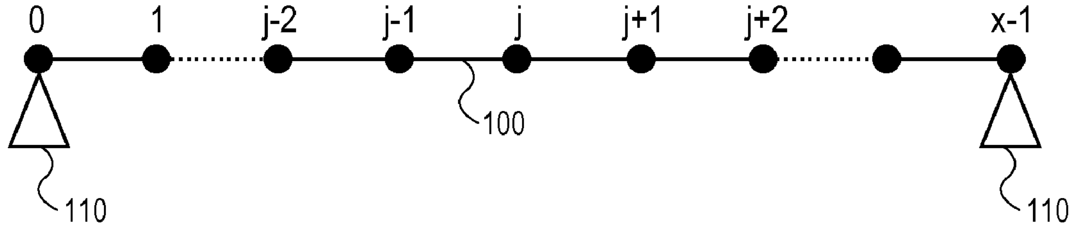
FIG. 1 (PRIOR ART)
FIG. 1 shows a prior art model of a string at rest.
Figure 2:
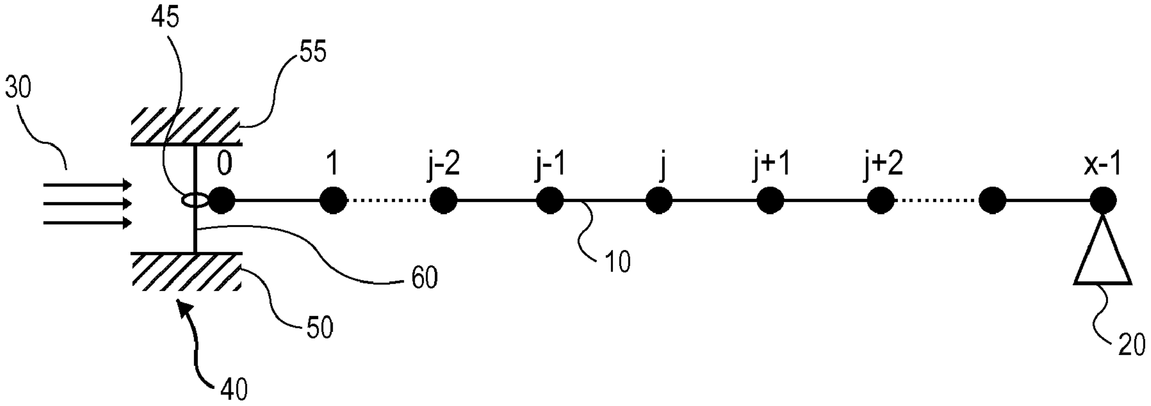
FIG. 2 shows a model of a string at rest according to the present invention.

In one preferred arrangement, shown in FIG. 2, the simulated string 10 is supported between two supports 20, 40 and is aligned at rest in an x-direction between the two supports 20, 40. One of the supports 20 (the right-hand support in FIG. 2 at position j=x−1) is a rigid support that does not allow the supported discrete element any degree of freedom. Thus, support 20 acts in the same manner as both the supports 110 in the prior art model shown in FIG. 1. The other support 40 (the left-hand support in FIG. 2 at position j=0) allows the supported element j=0 one degree of freedom in the y-direction, which is orthogonal to the x-direction.

In the arrangement shown in FIG. 2, the support 40 is envisaged as comprising a ring 45 attached to the supported element j=0. The ring 45 encircles a post 60, which is supported lengthways in the y-direction between upper and lower limits 50, 55. The movement of the ring 45 and hence of the supported element j=0 is limited within a certain range between the upper and lower limits 50, 55. However, this specific structure need not be used. Rather, it is sufficient that one of the supports can be envisaged as being movable only in the y-direction and that the supported element j=0 is rigidly attached to the support and has the same movement as the support. Thus, the excursion of the supported element j=0 can be limited for example between y[n, 0]=−a . . . +a.

The limits 50, 55 may be fixed or variable. In addition, they may be hard or cushioned to damp the movement of the supported element j=0 at the limits. Moreover, the distance from the lower limit 50 to the rest position of the supported element j=0 need not be the same as the distance from the upper limit 55 to the rest position.

The limits 50, 55 can be interpreted as the lips of a musician blowing along the string 10 and movement of the supported element j=0 between the limits 50, 55 can be interpreted as the movement of the string 10 in the clearance between the lips of the musician.

Figure 3:
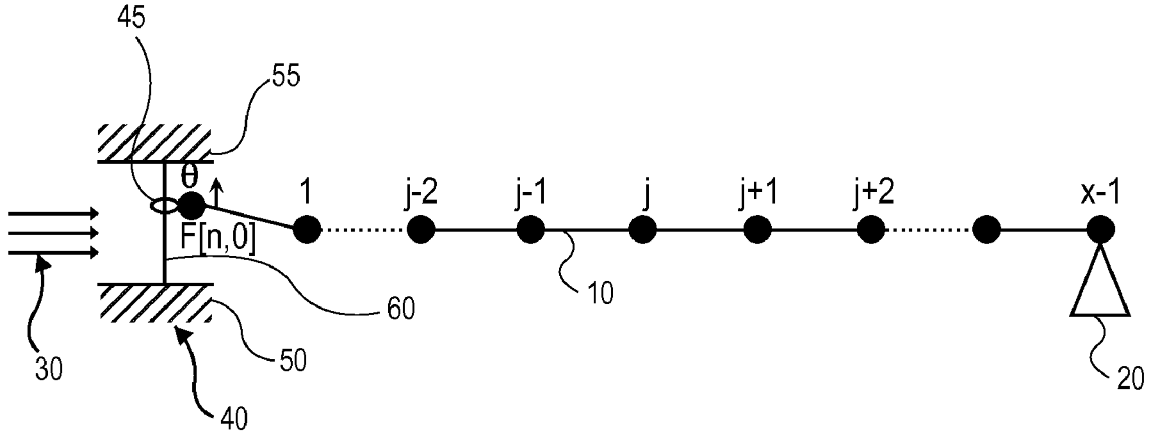
FIG. 3 shows a model of a string with a degree of excursion according to the present invention.

As noted above and shown in FIG. 2, the string 10 is aligned at rest in the x-direction between the two supports 20, 40. In the present invention, a simulated stream 30 of air or another fluid is blown from between the limits 50, 55 in the x-direction. As shown in FIG. 3, when a portion of the string 10 between the two leftmost elements—that is, between j=0 and j=1—is not aligned with the stream 30, it exerts a pressure and consequent force 70 on that section. The force from this pressure 70 causes the supported element j=0 to move in the y-direction until it reaches a "lip" limit 50, 55. In the example shown in FIGS. 2 and 3, this movement propagates along the string 10 towards the left and is reflected at the rigid support 20 at the right-most end of the string 10 and returns with inverted sign to the left support 40. As a result, the supported element j=0 will move towards the opposite "lip" limit 50, 55. If the blowing pressure is maintained, this movement will be accelerated or decelerated by the force resulting from the pressure. Moreover, the blowing pressure may be continuous and, consequently, self-sustained vibration can be set up.

In summary, as shown in FIG. 2 and in common with the prior art, the string 10 again comprises a plurality of discrete elements j from j=0 at the extreme left-hand end to j=x−1 at the extreme right-hand end. As in prior art FIG. 1, all the discrete elements j=0 to j=x−1 are aligned in the x-direction at rest. During vibration, the discrete elements j can move only in the y-direction, which is orthogonal to the x-direction. Thus, the plane of vibration is the plane of the paper on which FIGS. 1, 2 and 3 are drawn. The z-direction is orthogonal to the plane of vibration. The distance between each discrete element is dx.

However, in contrast to the prior art model shown in FIG. 1, the string is rigidly supported only at discrete element j=x−1 at the right-hand end by support 20. The support 40 at discrete element j=0 at the left-hand end allows one degree of freedom in the y-direction, with cushioned or hard limitation of the possible range of excursion for this supported element.

The force 70 in the y-direction experienced by supported element j=0 due to the pressure exerted by the airjet on the left-most portion of the string 10 between elements j=0 and j=1 can be approximated as follows:

$$F_{PRES}[n, 0] = P*\tan(\text{alpha})$$

$$= P*(y[n, 0] - y[n, 1])/dx \quad \text{(Equation 3)}$$

in which:

P denotes the pressure exerted by the air jet on the string;

y[n, 0] denotes the excursion of the supported element (j=0) at time n;

y[n, 1] denotes the excursion of the first element (j=1) to the right of the supported element (j=0) at time n; and (alpha) denotes the angle between the portion of the string 10 between elements j=0 and j=1 with the x-direction.

Optionally, the direction of the air jet may deviate by an angle (beta) from the x-direction but in the plane of vibration. In this case, the force 70 on the supported element j=0 will be:

$$F_{PRES}[n, 0] = P*\tan(\text{alpha}+\text{beta}) \quad \text{(Equation 3b)}$$

By providing one degree of freedom in the y-direction for the supported element j=0, a force caused by an air/fluid stream 30 can move element j=0 within the range allowed by the limiting "lips" 50, 55. Moreover, by providing an uninterrupted air jet the modelled string may have self-sustained oscillations.

It is noted that Equations 3 and 3b include a term for pressure and that hitherto it has been assumed that the string is provided in air and has an air jet applied to it. However, it will be clear that both the material in which the fluid is provided and the material of the jet can be altered. Changes in the material in which the fluid is provided can be effected by altering the term Lv in the differential continuous wave equation (Equation 1) and the corresponding terms c1 to c6 as appropriate for the discrete recursion formula (Equation 2). Changes in the material of the jet (or fluid stream) will have a corresponding impact on the pressure exerted by the fluid flow on the string. In particular, the pressure exerted by the fluid flow on the string will be affected by the viscosity of the fluid and the speed of flow. In addition, if the pressure distribution is not uniform as in the above examples, the pressure exerted by the fluid flow on the string will be affected by the pressure distribution. This may vary, for example, in dependence on the distance from the centre of the stream 30. Moreover, although the thickness and shape of the string are not taken into account in the preferred embodiment of the present invention, they can nonetheless be taken into account for more complex models. Calculation of appropriate pressures for use in Equation 3 and loss coefficients for use in Equations 1 and 2 fall within the abilities of persons skilled in the art.

In the preferred embodiment, the pressure is constant for any y excursion and is a parameter that can be directly set by the user and can be modulated by velocity, low frequency oscillators (LFOs), envelope generators and the like.

In addition, turbulence in the air is simulated by adding an appropriate random component to the force F[n, 0] applied to the movably supported element j=0. The randomness of this component can be generated using, for example, lowpass filtered noise. Moreover, the degree of turbulence can be associated with the velocity, viscosity and/or other qualities of the stream of the fluid medium, as discussed below. It is to be noted that without this additional random force component the modelled string 10 at rest shown in FIG. 2 could not be set into motion by a fluid stream 30 flowing only in the x-direction. This is because the term (tan alpha) in Equation 3 would always be zero.

Of course, if the stream 30 flows at an angle (beta) from the x-direction, the string may be set into motion without introducing a turbulence factor. In this case, the term tan(alpha+beta) will be non-zero and a force 70 will act on the supported element j=0

However, in the preferred arrangement of the present invention, the simulated turbulent force excites the supported element j=0 out of the rest position aligned with the x-direction. This creates an angle alpha between the portion of the string 10 between elements j=0 and j=1 and the x-direction. The stream 30 of fluid flowing in the x-direction can then exert a pressure on one the supported element, as discussed above.

The force component due to turbulent airflow at time n on supported element j=0 could for example be calculated as follows:

$$F_{TURB}[n, 0]=C_{TURB}*N_{RND}[n] \qquad \text{(Equation 4)}$$

in which:

$C_{TURB}$ denotes a turbulence coefficient; and $N_{RND}[n]$ denotes a random signal, such as lowpass filtered noise.

Other ways of introducing or modelling the force due to turbulence will be apparent to those skilled in the art.

The limiting of the movement of the supported element j=0 between a range due to the "lip" clearance can be realised in different ways. For example, limiting of the movement can be implemented by simulating damped springs that push supported element j=0 back into the allowed range as soon as its excursion y[n, 0] exceeds that range. A drawback of this implementation is that the resulting model tends to become unstable. Alternatively the new excursion can be calculated based on the sum of $F_{PRES}$ and $F_{TURB}$ and then be limited afterwards, using either cushioned or hard limits. This alternative approach does not model a practical mechanical system so accurately, but still retains the main aspects of such a system with minimum computational effort and improved model stability.

The new excursion for the supported element j=0 can thus be calculated as follows:

$$Y_{intermediate}=y[n, 0]+(F_{PRES}[n, 0]+F_{TURB}[n, 0])*dt^2/M[0]$$

$$y[n+1, 0]=\mathrm{Limit}(y_{intermediate}) \qquad \text{(Equation 5)}$$

in which:

M[0] denotes the mass of the supported element j=0; and

Limit(y) is a limiting function.

For hard limiting, the limiting function Limit(y) could for example be defined as:

Limit( ):: Maximum (Minimum(y, lower bound), upper bound).

In other words, for positive values of excursion y the value of Limit(y) is the lower of the values of y and the upper bound; and for negative values of y the value of Limit(y) is the higher (or more positive) of the values of y and the lower bound.

For cushioned limiting, the limiting function Limit(y) could for example be defined as:

Limit( ):: (upper bound+lower bound)/2+(upper bound−lower bound)/2*tan h((y−(upper bound+lower bound)/2)/((upper bound−lower bound)/2))

The tan h function behaves nearly linearly for absolute values around 0 but approaches non-linearly 1 or −1 respectively for higher absolute values. However, the value of the tan h function never reaches 1 or −1. Increasing positive values of y will lead to increasing positive values of the tan h function up to 1. Similarly, increasing negative values of y will lead to increasing negative values of the tan h function up to −1. Accordingly, once the respective upper and lower limits 50, 55—termed upper bound and lower bound in the two limiting formulae above—are set, with 0 being aligned with the right-hand support 20 in the x-direction, then the value of the Limit(y) of will approach those upper and lower limits as the value of y approaches those limits. However, the approach of Limit(y) to the limits will be cushioned compared to that of the excursion y.

In the prior art shown in FIG. 1, since the string 100 is immovably supported at both ends by supports 110, the recursion formula shown in Equation 2 is used to calculate the excursions only of the discrete elements between the supports—in other words, for elements j=1 to j=x−2. Similarly, in the preferred arrangement of the present invention, excursions are calculated only for the discrete elements between the supports—in other words, for elements j=1 to j=x−2. The excursion of the movably supported element j=0 is calculated only using Equation 5 and the immovably supported element j=x−1 has no excursion.

In a realistic model using the precepts of the present invention, the recursion formula shown as Equation 2 would also be used to calculate the excursion for j=0 for each time step n, with $F[n, 0]=F_{PRES}[n, 0]+F_{TURB}[n, 0]$. This would take account of the effect of wave propagation on the movably supported element j=0. However, that would detune the simulated string in a non-linear way. In other words, the string would effectively be lengthened by dx, which is the distance between discrete element j=0 and j=1. Thus, the string would be lengthened by a factor (x−1)/(x−2). However, it would have the same tension and the recursion formula would use the same values for the coefficients c1 to c6. Accordingly, the string would be detuned downwards and hence tones would have a lower pitch.

It would be possible separately to calculate the tension for the required tone pitch. However, in the preferred arrangement the user is able to set the "lip clearance" parameter or the value of the upper and lower limits. If the user sets the lips closed so that the upper and lower limits are both zero, then the string is effectively immovably supported at both ends with the discrete element fixed in the y-direction. In that case, the string is effectively be shortened again and the resulting pitch increases.

It is preferable if dependency of the pitch on the lip clearance in this way is removed. This becomes more important for sounds where the parameters vary over time. Bearing in mind that the preferred arrangement of the present invention is intended to maintain the ability to excite the string by means other than blowing, one example of the parameters varying in time is a gradual reduction in the value of "lip clearance" parameter from 2.0 to 0.0 over a period of 2 seconds and a gradual increase in the bowing speed over the same period.

Accordingly, the recursion formula is preferably still only calculated for j=1 . . . x−1, while the excursion of the supported element j=0 is calculated using Equation 5. This allows a user to change the intensity of excitation in terms of both fluid medium (or blow) pressure and “lip clearance” without unwanted side effects.

Starting at time n=0, the force F[0, 0] exerted on the supported element j=0 can be calculated. The excursion of all elements j=1 to j=x−2 between the supports at time n=0 will be zero.

Subsequently, the excursion y[1, 0] of the supported element j=0 at time n=1 from its rest position due to the fluid flow including turbulence can be calculated using Equation 5.

Since the force has only acted on the portion of string between elements j=0 and j=1 at time n=1, there will be no effect on the other elements of the string at this time. Thus, using Equation 2, the excursion of all elements j=2 to j=x−2 will still be set at zero at time n=1.

However, at time n=2 the force on element j=0 will have acted to effect other elements on the string. In other words, the movement of element j=0 will have begun propagating down the string.

Since the excursion of elements j=1 and j=x−2 needs to be calculated using the recursion formula and the recursion formula requires elements j−2 and j+2 for calculating the next excursion of element j, additional dummy elements at j=−1 and at j=x are needed. These dummy elements can be visualised as lying at the ends of the strings outside the supports 20, 40. At the rest position at time n=0, these dummy elements are assigned a position in alignment with the other elements. Thus, y[0, −1]=0 and y[0, x]=0. After each calculation of new excursions for all elements, these dummy elements are set to the negated relative excursion of their respective counterpart elements j=1 and j=x−2 on the other side of the supports 20, 40.

Consequently, the excursion y[n+1, −1] of the left dummy element for the next sample is given by:

$$y[n+1, -1]=y[n+1, 0]-(y[n+1, 1]-y[n+1, 0]) \quad \text{(Equation 6)}$$

Similarly, the excursion y[n+1, x] of dummy element j=x at the opposite extreme end for the next sample is given by:

$$y[n+1, x]=-y[n+1, x-2] \quad \text{(Equation 7)}$$

since y[n, x−1] is always zero.

From the discrete recursion formula shown as Equation 2, it can be seen that at time n=1 the oscillation will have propagated from element j=0 as far as element j=2, since this formula uses the terms j−2 and j−1.

The excursion of all the elements j=1 to j=x−2 can then be calculated using the recursion formula shown as Equation 2 for n=2, 3, 4, and so forth. This will illustrate the progression of the wave along the string.

What is more, the discrete recursion formula can also be used to calculate the additional effects of other forces applied to other discrete elements on the string between the two supports, as in the prior art, at the same time if required. In other words, the simulated string of the present invention can not only be “blown” in the longitudinal direction of the string. It can also be struck or otherwise excited using a model piano hammer, plectrum, bow and so forth. Moreover, the string can be struck, plucked, bowed and so on at the same time it is being blown.

The foregoing description assumes that the stream of fluid flowing in the x-direction or at an angle beta to the x-direction exerts a pressure only on the portion of the string between the supported element j=0 and the next element j=1 and not on any other portions of the string. This results in a comparatively simple but effective model that is not computationally expensive.

However, the model can be further refined by assuming that the stream of fluid flowing in the x-direction also exerts a force on other portions of the string once they have been excited. In particular, as soon as any discrete element is no longer aligned with the right-hand support 20 in the x-direction, then the stream of fluid 30 can be assumed to exert a pressure on the portions of the string between that element and the elements adjacent to it. This pressure can be assumed to be dependent on the distance of the left end of the string, for example so that P[j] decreases linearly or exponentially with increasing j.

In this case, the force F[n, j] at time n acting on each discrete element from j=1 to j=x−2 due to the pressure can be mathematically modelled as:

$$F[n, j]=P[j]*(y[n, j]-y[n, j-1])/dx+P[j+1]*(y[n, j]-y[n, j+1])/dx \quad \text{(Equation 8)}$$

If the discrete recursion formula shown as Equation 2 is to be used, with the simplifying assumptions that dx=1 and dt=1, then Equation 10 can be simplified as follows:

$$F[n, j]=P[j]*(y[n, j]-y[n, j-1])+P[j+1]*(y[n, j]-y[n, j+1]) \quad \text{(Equation 9)}$$

Again, turbulence in the air would preferably be simulated by adding an appropriate random component to the force F[n, j] applied to each discrete element j=1 to j=x−2 between the supports.

This assumes that the fluid flow acts on all “unaligned” portions of the string equally—in other words, each discrete element having an excursion at a particular time has a force acting on it due to the pressure exerted by the fluid flow and, apart from “blow” pressure, the magnitude of that force is dependent only on the excursion of the element in question and of the neighbouring elements. However, it would be possible to further model how the positioning of the elements of the string affects the flow of the fluid stream itself. In particular, it would be possible to model how the discrete elements in the string create eddy currents in the fluid flow and how upstream discrete elements can “shadow” downstream discrete elements and therefore effect the force acting on them.

The modelling of how the positioning of the elements of the string affects the flow of the fluid stream itself, especially the modelling of eddy currents, would increase the computational cost of the model significantly and require either or both more powerful processors or longer processing time. As an alternative, a simplified “shadowing” algorithm can be provided in which the remaining pressure at position j not only decreases with increasing j, but is also reduced by a certain amount at each preceding “shadowing” section.

As an alternative to, or as well as, providing a turbulence component in the force resulting from the fluid stream 30, it would be possible to provide one or more of the elements with an initial excursion at time n=0, so that it/they is/are not aligned with the supported element j=x−1 in the x-direction. In that case, the stream of fluid 30 would immediately act to provide a force on the unaligned element(s).

In addition to or instead of the either or both the above excitation methods, the string 10 can be excited from the initial rest position using an excitation in the direction of movement of the string, such as the prior art methods of striking, plucking and bowing, It should be noted that in the present invention, excitation by fluid flow in the x-direction or at an angle beta to the x-direction is modelled. In addition, any other means of exciting the string (such as the prior art methods of striking, plucking and bowing) can be applied simultaneously.

The present invention as described in the foregoing description can be used to simulate the blowing of a string of a musical instrument. Various parameters can be set by the user and will affect the resultant oscillations of the strings and the consequent sound output. For example, the clearance between the user's lips and the blow pressure can be used to adjust the timbre of the note created.

In common with the blow pressure, the value of the lip clearance parameter can be set by a user and can be modulated by velocity, LFOs, envelope generators, external control signals and the like.

As the value for the lip clearance setting increases, so the volume of the sound output increases. Similarly, increasing the pressure creates extra brilliance in the sound and forces the model into higher modes. In other words, in common with a flute, the pitch of a note can be raised to higher modes of vibration by blowing harder, for example to one octave above.

There are many different ways in which the simulated vibration of the string can be used to create sound. For example, the force that the string applies to the right-hand support 20 can be calculated. This simulates the way a violin or acoustic guitar works in terms of sound radiation. Another way is to simulate an electromagnetic pick-up such as that used for an electric guitar by taking into account only the vibration of one element or a weighted sum of the vibrations of several neighbouring elements. Such methods are well known in the art and need not be described further.

Figure 4:
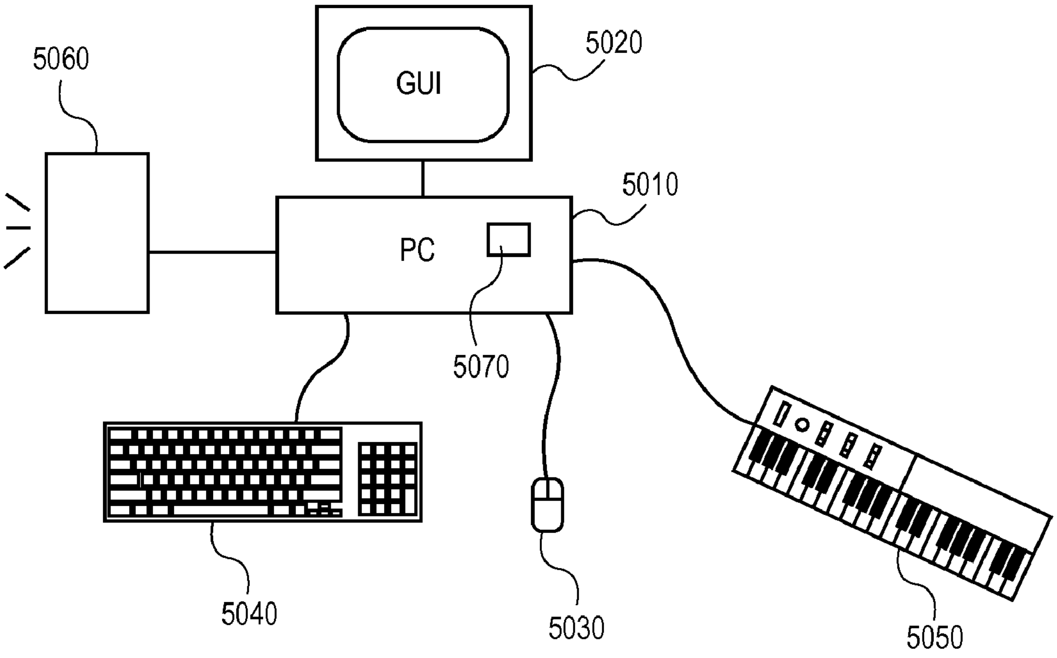
FIG. 4 shows one embodiment of an apparatus according to the present invention, in which a personal computer is programmed to run a synthesiser application program.

The present invention may be implemented in a synthesiser application program run by a personal computer (PC) 5010 or other types of data processing systems with a processor 5070, as shown in FIG. 4. In addition to the PC 5010 and its processor 5070, such an implementation may use a monitor 5020, a mouse 5030, a keyboard 5040, a speaker 5060 and optionally a further, piano-style keyboard 5050. In that case, the monitor 5020 of the PC 5010 is preferably used to display the simulated string 10 and the various exciters in a Graphical User Interface. The mouse 5030 and keyboard are preferably used to select preferred parameter values for the method. Previously selected parameter values may have been created by the user or may have been created by the programmer and stored together with or separately from the synthesiser application program. It will be appreciated that a typical data processing system will include a processor (such as a G5 microprocessor from IBM or a Pentium microprocessor from Intel) and a bus and a memory (which is a form of a machine readable medium). The processor and memory are coupled to the bus, and the memory stores the application program (usually an executable computer program) which provides the instructions to the processor which performs the operations (e.g. simulations of a string) specified by the instructions. A typical data processing system is shown in U.S. Pat. No. 6,222,549 which is hereby incorporated herein by reference.

An apparatus of the present invention is not limited to an appropriately programmed PC and peripheral devices. It also includes any specifically designed, stand alone or intermediate apparatuses such as dedicated sound (e.g. music) synthesisers.

The foregoing description has been given by way of example only and it will be appreciated by a person skilled in the art that modifications can be made without departing from the scope of the present invention. In particular, references to the left and right are not intended as limiting references.

The invention claimed is:

1. A machine-implemented method for creating a musical sound, the method comprising:

establishing a model of a string that rests in a fluid medium and has a fixed end and a movable end;

simulating a turbulence to excite the moveable end of the string from a rest position;

simulating a force exerted by a stream of the fluid medium flowing in a direction along a longitudinal axis of the string;

calculating a self-sustained vibration of the string in response to the turbulence and the force;

calculating a representation of a sound based on the self-sustained vibration; and creating the musical sound by a sound generating device based on the representation.

2. The method according to claim 1, wherein:

the string is supported between two supports and is aligned at rest in a first direction between the two supports;

a first of the two supports allows movement in a second direction orthogonal to the first direction and a second of the two supports does not allow movement; and the string is caused from rest to vibrate in a plane, which includes the first and second directions, by turbulence in the fluid flow causing the stream of fluid medium to exert a pressure on the string in the second direction.

3. The method according to claim 2, wherein:

movement of the string out of alignment with the first direction causes the stream of fluid medium flowing in the first direction to exert the force on the string in the second direction.

4. The method according to claim 1, wherein:

the string is supported between two supports aligned in a first direction, a first of the two supports is rigid and a second of the two supports allows movement in a second direction orthogonal to the first direction; and the string is caused to vibrate in a plane, which includes the first and second directions, by the stream of fluid medium flowing in a direction having a component in the second direction.

5. The method according to claim 1, wherein:

the string is supported between two supports aligned in an x-direction;

a first of the two supports allows movement in a y-direction orthogonal to the x-direction and a second of the two supports does not allow movement;

the string comprises a plurality of discrete elements aligned at rest in the x-direction and spaced apart by a distance dx; and the discrete elements are able to move in discrete steps of time dt in the y-direction only.

6. The method according to claim 5, in which the string comprises a plurality of j discrete elements from j=0 at one end movably supported by the first support to j=x−1 at the opposite end immovably supported by the second support; wherein j is an integer; and the stream of fluid medium flows in the x-direction and exerts a pressure on the string between elements j=0 and j=1.

7. The method according to claim 6, wherein the force $F_{PRES}[n, 0]$ at time n acting on the movably supported element j=0 due to the pressure on the string between the movably supported element j=0 and adjacent element j=1 is given by:

$$F_{PRES}[n, 0]=P*(y[n, 0]-y[n, 1])/dx$$

in which:

P denotes the pressure exerted by the stream of fluid medium on the string between the movably supported element j=0 and adjacent element j=0;

$y[n, 0]$ denotes the excursion of the movably supported element j=0 at time n; and $y[n, 1]$ denotes the excursion of the adjacent element j=1 at time n.

8. The method according to claim 6, wherein the force $F_{TURB}[n, 0]$ at time n acting on the movably supported element j=0 due to the turbulence in the stream of fluid medium is given by:

$$F_{TURB}[n, 0]=C_{TURB}*N_{RND}[n]$$

in which:

$C_{TURB}$ denotes a turbulence coefficient; and $N_{RND}[n]$ denotes a random signal.

9. The method according to claim 8, wherein the random signal comprises a low pass filtered noise.

10. The method according to claim 6, wherein the excursion y[n+1, 0] of the movably supported element for the next sample due to the pressure on the string between the movably supported element j=0 and adjacent element j=1 is given by:

$$y[n+1, 0]=y[n, 0]+(F_{PRES}[n, 0])+F_{TURB}[n, 0])*dt^{2}/M[0]$$

in which:

$y[n, 0]$ denotes the excursion of the movably supported element j=0 at time n; and $F_{PRES}[n, 0]$ denotes the force at time n acting on the movably supported element j=0 due to the pressure on the string between the movably supported element j=0 and adjacent element j=1;

$F_{TURB}[n, 0]$ denotes the force at time n acting on the movably supported element j=0 due to the turbulence in the stream of fluid medium; and M[0] denotes the mass of the movably supported element j=0.

11. The method according to claim 10, wherein the excursion y[n+1, 0] is limited.

12. The method according to claim 6, wherein the stream of the fluid medium exerts a pressure on the string between each of the elements; and wherein the force F[n, j] at time n acting on each discrete element from j=1 to j=x−2 due to the pressure P is given by:

$$F[n, j]=P[j]*(y[n, j]-y[n, j-1])/dx+P[j]*(y[n, j]-y[n, j+1])/dx.$$

13. The method according to claim 12, wherein the pressure P decreases linearly or exponentially with increasing j.

14. The method according to claim 5, wherein a wave equation is used to relate the movement of the string in time to the excursion of the movable end, the wave equation being an approximation of a continuous wave equation $$M\frac{\partial^2 y}{\partial t^2} = T\frac{\partial^2 y}{\partial x^2} - S\frac{\partial^4 y}{\partial x^4} + L_T\frac{\partial^3 y}{\partial x^2 \partial t} - L_S\frac{\partial^5 y}{\partial x^4 \partial t} - L_v\frac{\partial y}{\partial t} + F(x, t)$$

in which:

F(x, t) denotes an external force at coordinate x on the string at time t;

M denotes mass per length;

S denotes stiffness of the string;

T denotes tension of the string;

Ls denotes a loss associated with the stiffness of the string;

Lt denotes a loss associated with the tension of the string; and

Lv denotes a loss associated with the turbulent flow of the fluid medium.

15. The method according to claim 14, wherein the approximation of the continuous wave equation is the discrete recursion formula:

$$y[n+1, j] = (y(n, j-2]\cdot c1 + y[n, j-1]\cdot c2 + y[n, j]\cdot c3 + y[n, j+1]\cdot c2 + y[n, j+2]\cdot c1 + y[n-1, j-2]\cdot c4 + y[n-1, j-1]\cdot c5 + y[n-1, j]\cdot c6 + y[n1, j+1]\cdot c5 + y[n-1, j+2]\cdot c4)/ M[j] + 2y[n, j] + F[n, j]/M[j]$$

in which:

dx=1;

dt=1;

y[n, j] denotes the excursion of discrete element j in the y-direction at time n;

y[n 1, j] denotes the excursion of discrete element j in the y-direction at time n+1;

y[n, j+1] denotes the excursion of discrete element j+1 in the y-direction at time n;

M[j] denotes the mass of discrete element j;

F[n, j] denotes an additional external force acting on a discrete element j at time n; and c1 to c6 are coefficients, which depend on the material parameters of the string and the surrounding media.

16. The method according to claim 15, wherein $$c1=-(S+Ls);$$

$$c2=T+4S+Lt+4Ls;$$

$$c3=-(2T+6S+Lv+2Lt+6Ls);$$

$$c4=Ls;$$

$$c5=-(Lt+4Ls);\ \text{and}$$

$$c6=Lv+2Lt+6Ls.$$

17. The method according to claim 15, wherein the discrete recursion formula is solved for the elements adjacent the respective supports by providing a dummy element at opposite ends of the string so that the excursion y[n+1, −1] of a dummy element adjacent the movably supported element for the next sample is given by:

$$y[n+1, -1]=y[n+1, 0]-(y[n+1, 1]-y[n+1, 0])$$

and the excursion y[n+1, x] of a dummy element adjacent the immovably supported element for the next sample is given by:

$$y[n+1, x]=-y[n+1, x-2].$$

18. A machine readable medium providing executable computer program instructions which when executed cause a data processing system to perform a method for creating a musical sound, the method comprising:

establishing a model of a string that rests in a fluid medium and has a fixed end and a movable end;

simulating a turbulence to excite the moveable end of the string from a rest position;

simulating a force exerted by a stream of the fluid medium flowing in a direction along a longitudinal axis of the string;

calculating a self-sustained vibration of the string in response to the turbulence and the force;

calculating a representation of a sound based on the self-sustained vibration; and creating the musical sound by a sound generating device based on the representation.

19. The machine readable medium according to claim 18, wherein:

the string is supported between two supports and is aligned at rest in a first direction between the two supports;

a first of the two supports allows movement in a second direction orthogonal to the first direction and a second of the two supports does not allow movement; and the string is caused from rest to vibrate in a plane, which includes the first and second directions, by turbulence in the fluid flow causing the stream of fluid medium to exert a pressure on the string in the second direction.

20. The machine readable medium according to claim 19, wherein:

movement of the string out of alignment with the first direction causes the stream of fluid medium flowing in the first direction to exert the force on the string in the second direction.

21. The machine readable medium according to claim 18, wherein:

the string is supported between two supports aligned in a first direction, a first of the two supports is rigid and a second of the two supports allows movement in a second direction orthogonal to the first direction; and the string is caused to vibrate in a plane, which includes the first and second directions, by the stream of fluid medium flowing in a direction having a component in the second direction.

22. The machine readable medium according to claim 18, wherein:

the string is supported between two supports aligned in an x-direction;

a first of the two supports allows movement in a y-direction orthogonal to the x-direction and a second of the two supports does not allow movement;

the string comprises a plurality of discrete elements aligned at rest in the x-direction and spaced apart by a distance dx; and the discrete elements are able to move in discrete steps of time dt in the y-direction only.

23. The machine readable medium according to claim 22, in which the string comprises a plurality of j discrete elements from j=0 at one end movably supported by the first support to j=x−1 at the opposite end immovably supported by the second support; wherein j is an integer; and the stream of fluid medium flows in the x-direction and exerts a pressure on the string between elements j=0 and j=1.

24. The machine readable medium according to claim 23, wherein the force $F_{PRES}$[n, 0] at time n acting on the movably supported element j=0 due to the pressure on the string between the movably supported element j=0 and adjacent element j=1 is given by:

$$F_{PRES}[n,0]=P*(y[n,0]-y[n,1])/dx$$

in which:

P denotes the pressure exerted by the stream of fluid medium on the string between the movably supported element j=0 and adjacent element j=0;

y[n, 0] denotes the excursion of the movably supported element j=0 at time n; and y[n, 1] denotes the excursion of the adjacent element j=1 at time n.

25. The machine readable medium according to claim 23, wherein the force $F_{TURB}$[n, 0] at time n acting on the movably supported element j=0 due to the turbulence in the stream of fluid medium is given by:

$$F_{TURB}[n,0]=C_{TURB}*N_{RND}[n]$$

in which:

$C_{TURB}$ denotes a turbulence coefficient; and $N_{RND}$[n] denotes a random signal.

26. The machine readable medium according to claim 23, wherein the excursion y[n+1, 0] of the movably supported element for the next sample due to the pressure on the string between the movably supported element j=0 and adjacent element j=1 is given by:

$$y[n+1,0]=y[n,0]+(F_{PRES}[n,0]+F_{TURB}[n,0])*dt^2/M[0]$$

in which:

y[n, 0] denotes the excursion of the movably supported element j=0 at time n; and $F_{PRES}$[n, 0] denotes the force at time n acting on the movably supported element j=0 due to the pressure on the string between the movably supported element j=0 and adjacent element j=1;

$F_{TURB}$[n, 0] denotes the force at time n acting on the movably supported element j=0 due to the turbulence in the stream of fluid medium; and M[0] denotes the mass of the movably supported element j=0.

27. The machine readable medium according to claim 26, wherein the excursion y[n+1, 0] is limited.

28. The machine readable medium according to claim 23, wherein the stream of the fluid medium exerts a pressure on the string between each of the elements; and wherein the force F[n, j]at time n acting on each discrete element from j=1 to j=x−2 due to the pressure P is given by:

$$F[n,j]=P[j]*(y[n,j]-y[n,j-1])/dx+P[j]*(y[n,j+1])/dx.$$

29. The machine readable medium according to claim 28, wherein the pressure P decreases linearly or exponentially with increasing j.

30. The machine readable medium according to claim 22, wherein a wave equation is used to relate the movement of the string in time to the excursion of the movable end, the wave equation being an approximation of a continuous wave equation $$M\frac{\partial^2 y}{\partial t^2}=T\frac{\partial^2 y}{\partial x^2}-S\frac{\partial^4 y}{\partial x^4}+L_T\frac{\partial^3 y}{\partial x^2\partial t}-L_S\frac{\partial^5 y}{\partial x^4\partial t}-L_v\frac{\partial y}{\partial t}+F(x,t)$$

in which:

F(x, t) denotes an external force at coordinate x on the string at time t;

M denotes mass per length;

S denotes stiffness of the string;

T denotes tension of the string;

Ls denotes a loss associated with the stiffness of the string;

Lt denotes a loss associated with the tension of the string; and

Lv denotes a loss associated with the turbulent flow of the fluid medium.

31. The machine readable medium according to claim 30, wherein the approximation of the continuous wave equation is the discrete recursion formula:

$$y[n+1,\ j] = (y[n,\ j-2]c1 + y[n,\ j-1]c2 + y[n,\ j]c3 + y[n,\ j+1]c2 + y[n,\ j+2]c1 + y[n-1,\ j-2]c4 + y[n-1,\ j-1]c5 + y[n-1,\ j]c6 + y[n1,\ j+1]c5 + y[n-1,\ j+2]c4)/M[j] + 2y[n,\ j] + F[n,\ j]/M[j]$$

in which:

dx=1;

dt=1;

y[n, j] denotes the excursion of discrete element j in the y-direction at time n;

y[n+1, j] denotes the excursion of discrete element j in the y-direction at time n+1;

y[n, j+1] denotes the excursion of discrete element j+1 in the y-direction at time n;

M[j] denotes the mass of discrete element j;

F[n, j] denotes an additional external force acting on a discrete element j at time n; and c1 to c6 are coefficients, which depend on the material parameters of the string and the surrounding media.

32. The machine readable medium according to claim 31, wherein $c1=-(S+Ls)$;

$c2=T+4S+Lt+4Ls$;

$c3=-(2T+6S+Lv+2Lt+6Ls)$;

$c4=Ls$;

$c5=-(Lt+4Ls)$; and $c6=Lv+2Lt+6Ls$.

33. The machine readable medium according to claim 31, wherein the discrete recursion formula is solved for the elements adjacent the respective supports by providing a dummy element at opposite ends of the string so that the excursion y[n+1, −1] of a dummy element adjacent the movably supported element for the next sample is given by:

$$y[n+1, -1]=y[n+1, 0]-(y[n+1, 1]-y[n+1, 0])$$

and the excursion y[n+1, x] of a dummy element adjacent the immovably supported element for the next sample is given by:

$$y[n+1, x]=-y[n+1, x-2].$$

34. An apparatus comprising:

a processing element to establish a model of a string that rests in a fluid medium and has a fixed end and a movable end, to simulate a turbulence to excite the moveable end of the string from a rest position, to simulate a force exerted by a stream of the fluid medium flowing in a direction along a longitudinal axis of the string, the processing element further to calculate a self-sustained vibration of the string in response to the turbulence and the force, and to calculate a representation of a sound based on the self-sustained vibration a sound generating element, coupled to the processing element, to create a musical sound based on the representation; and a storage device, coupled to the processing element, to store data used by the processing elements.

35. The apparatus according to claim 34, wherein:

the string is supported between two supports and is aligned at rest in a first direction between the two supports;

a first of the two supports allows movement in a second direction orthogonal to the first direction and a second of the two supports does not allow movement; and the string is caused from rest to vibrate in a plane, which includes the first and second directions, by turbulence in the fluid flow causing the stream of fluid medium to exert a pressure on the string in the second direction.

36. The apparatus according to claim 35, wherein:

movement of the string out of alignment with the first direction causes the stream of fluid medium flowing in the first direction to exert the force on the string in the second direction.

37. The apparatus according to claim 34, wherein:

the string is supported between two supports aligned in a first direction, a first of the two supports is rigid and a second of the two supports allows movement in a second direction orthogonal to the first direction; and the string is caused to vibrate in a plane, which includes the first and second directions, by the stream of fluid medium flowing in a direction having a component in the second direction.

38. The apparatus according to claim 34, wherein:

the string is supported between two supports aligned in an x-direction;

a first of the two supports allows movement in a y-direction orthogonal to the x-direction and a second of the two supports does not allow movement;

the string comprises a plurality of discrete elements aligned at rest in the x-direction and spaced apart by a distance dx; and the discrete elements are able to move in discrete steps of time dt in the y-direction only.

39. The apparatus according to claim 38, in which the string comprises a plurality of j discrete elements from j=0 at one end movably supported by the first support to j=x−1 at the opposite end immovably supported by the second support; wherein j is an integer; and the stream of fluid medium flows in the x-direction and exerts a pressure on the string between elements j=0 and j=1.

40. The apparatus according to claim 39, wherein the force $F_{PRES}$[n, 0 ]at time n acting on the movably supported element j=0 due to the pressure on the string between the movably supported element j=0 and adjacent element j=1 is given by:

$$F_{PRES}[n, 0]=P*(y[n, 0]-y[n, 1])/dx$$

in which:

P denotes the pressure exerted by the stream of fluid medium on the string between the movably supported element j=0 and adjacent element j=0;

y[n, 0] denotes the excursion of the movably supported element j=0 at time n; and y[n, 1] denotes the excursion of the adjacent element j=1 at time n.

41. The apparatus according to claim 39, wherein the force $F_{TURB}$ [n, 0]at time n acting on the movably supported element j=0 due to the turbulence in the stream of fluid medium is given by:

$$F_{TURB}[n, 0]=C_{TURB}*N_{RND}[n]$$

in which:

$C_{TURB}$ denotes a turbulence coefficient; and $N_{RND}$[n] denotes a random signal.

42. The apparatus according to claim 39, wherein the excursion y[n+1, 0]of the movably supported element for the next sample due to the pressure on the string between the movably supported element j=0 and adjacent element j=1 is given by:

$$y[n+1, 0]=y[n, 0]+(F_{PRES}[n, 0]+F_{TURB}[n, 0])*dt^2/M[0]$$

in which:

y[n, 0] denotes the excursion of the movably supported element j=0 at time n; and $F_{PRES}$[n, 0] denotes the force at time n acting on the movably supported element j=0 due to the pressure on the string between the movably supported element j=0 and adjacent element j=1;

$F_{TURB}$[n, 0]denotes the force at time n acting on the movably supported element j=0 due to the turbulence in the stream of fluid medium; and M[0] denotes the mass of the movably supported element j=0.

* * * * *